Patented Apr. 18, 1939

2,155,148

UNITED STATES PATENT OFFICE 2,155,148

METHOD OF MANUFACTURING CAFFEINE-CONTAINING CHOCOLATE

Albert Rinne, Berlin-Charlottenburg, Germany

No Drawing. Application August 5, 1937, Serial No. 157,604. In Germany July 4, 1936

7 Claims. (Cl. 99—23)

Kola chocolates, that is to say, chocolates having an addition of pulverized kola nut, have been known for many years. These products of manufacture have, however, never been accepted by commerce in a measure worth mentioning. The cause is chiefly that the products presented in trade up to now do not show, as regards their physiological effects, any material difference from the effect of normal chocolates, especially as regards the animating effect upon the nerve system experienced when fresh kola nuts are taken. On the other hand, the addition of dried kola nut in pulverulent state impairs the taste of the chocolate so materially, by reason of the after-taste which is similar to the taste of oak bark and produces a scratching feeling in the mouth, that it has not been possible to introduce into trade, in a measure worth mentioning, a kola chocolate composed of kola nut and chocolate. Another circumstance to which that negative result is due is that the dried kola nut of commerce the caffeine, as well as the other active stimulating agents of the fresh kola nut, are partly contained in an insoluble form or in a form which the human body can assimilate only with difficulty, in consequence whereof the respective agents, if exerting any physiological effect at all, exert it by far too slowly as regards the purpose for which the kola chocolate is taken. The manufacture of a palatable, actually refreshing kola chocolate, able to increase the bodily and/or intellectual efficiency of the persons eating it, thus could not be attained merely by means of mixing pulverulent kola with chocolate.

I have discovered that the problem in question can be solved by employing as an addition to the chocolate, instead of pulverulent kola or together with the same, kola caffeine in the form of an extract of the kola nut. This nut contains on the average from 1.5 to 2.5% of caffeine. In order to attain a distinctly perceptible physiological effect, as regards an increase of the bodily and/or intellectual efficiency and also to relieve fatigue, the chocolate must contain about 0.2% of caffeine. This would mean an addition of about 10% of pulverulent kola, but a chocolate containing such an amount of pulverulent kola is completely useless as food by reason of its sharp, undesired additional taste, and would be unsaleable.

In accordance with the present invention I am able to manufacture a kola-chocolate containing the amount of caffeine requisite for the purpose in view, without the above-mentioned drawbacks. I attain this object by making from the kola nut, with the aid of a suitable extracting agent, an extract which then is inspissated, preferably under vacuo, and is finally admixed with the chocolate, while this is being manufactured, either in the solid state or in solution. In addition to this extract, pulverulent kola nut may also be admixed in an amount of from about 1–5%. The extract and the pulverulent kola nut may be admixed with one another and this mixture may then be admixed with the chocolate. Owing to the disjunction of the active agents of the kola nut these agents can be more easily assimilated so that, as has been ascertained, a kola-chocolate manufactured in the manner disclosed exerts a practically instantaneous effect upon the nerve system, that effect being then gradually and slowly continued by the action of the pulverulent kola nut.

Thus, while a chocolate containing as much as 10% of pulverulent kola nut loses the taste and the character of chocolate and is, therefore, unpalatable, and also exerts very little useful effect, kola-chocolate manufactured according to this invention and containing, for instance, about 0.2% of caffeine introduced into the chocolate partly in the form of an extract and partly in the form of pulverulent kola nut, is fully palatable and the desired physiological effect makes its appearance at once and continues for a long time.

I have, furthermore, discovered that the effect of the kola caffeine, irrespective of whether the kola nut is used in the form of an extract or in pulverulent form, is remarkably increased if, in addition to the active components of the kola nut, a small amount of roasted coffee is introduced into the chocolate. The increase of the effect seems to be due to the fact that the components of the roasted coffee increase the extractability of the caffeine from the kola nut. It seems that the phenomena arising are similar to those experienced on the one hand with the caffeine of tea and on the other hand with the caffeine of roasted coffee, the effect of the caffeine of the tea taking place considerably slower, and being weaker, than the effect of the coffee in spite of the caffeine content of tea being larger than that of coffee.

Besides, the addition of roasted coffee presents the further useful effect that the natural taste of the dried kola nut is very well concealed so that quantities of kola nut can be utilized which otherwise, without the addition of the coffee or its equivalent, would render the preparation unpalatable. This latter is a commercially important feature of the invention.

Having thus described the invention, what is claimed as new and desired to be secured by Letters Patent is:

1. In a process for the manufacture of kola chocolate, the steps of adding to the chocolate mass a kola nut product and a coffee product.

2. In a process for the manufacture of kola chocolate, the steps of adding to the chocolate mass a kola nut extract and a coffee product.

3. In a process for the manufacture of kola chocolate, the steps of adding to the chocolate mass kola nut powder and a coffee product.

4. In a process for the manufacture of kola chocolate, the steps of adding to the chocolate mass a kola nut extract and an extract of roasted coffee.

5. In a process for the manufacture of kola chocolate, the steps of adding to the chocolate mass a kola nut extract and powdered roasted coffee.

6. In a process for the manufacture of kola chocolate, the steps of adding to the chocolate mass kola nut powder and an extract of roasted coffee.

7. In a process for the manufacture of kola chocolate, the steps of adding to the chocolate mass kola nut powder and powdered roasted coffee.

ALBERT RINNE.